O. M. & S. E. FRIEND.
MACHINE FOR WASHING, TEMPERING, HEATING, AND HULLING WHEAT.
APPLICATION FILED JUNE 29, 1914.
1,196,770.
Patented Sept. 5, 1916.
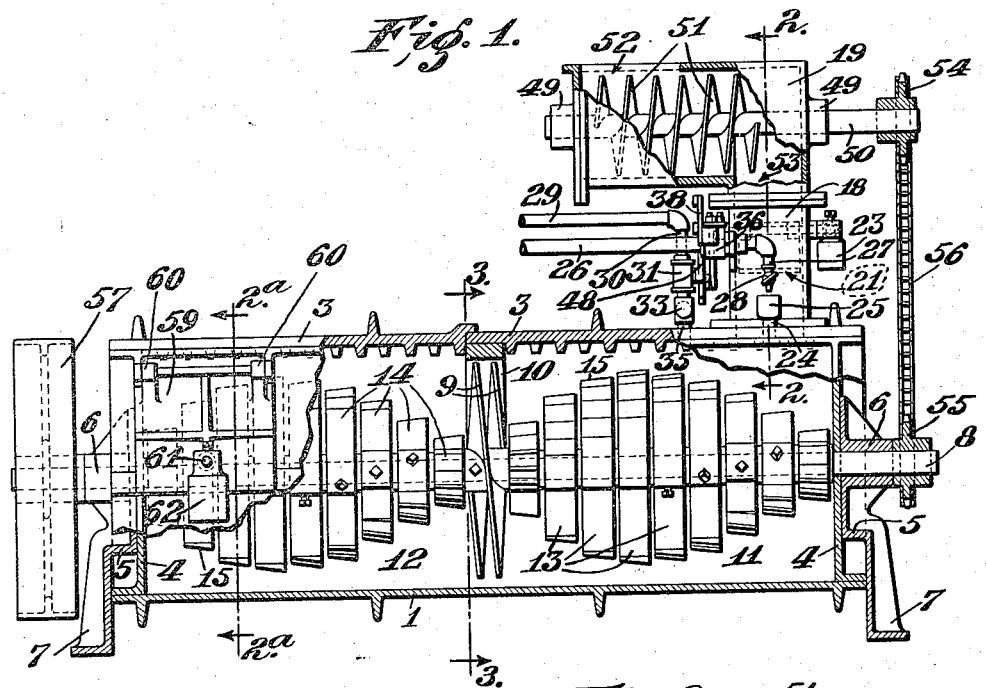
Witnesses:
G. A. Pennington
Maxine Brown
Inventors:
Orlando M. Friend,
Samuel E. Friend,
By Bruce A. Elliott,
their Atty.

UNITED STATES PATENT OFFICE.

ORLANDO M. FRIEND AND SAMUEL E. FRIEND, OF HANNIBAL, MISSOURI.

MACHINE FOR WASHING, TEMPERING, HEATING, AND HULLING WHEAT.

1,196,770. Specification of Letters Patent. Patented Sept. 5, 1916.

Application filed June 29, 1914. Serial No. 847,935.

*To all whom it may concern:*

Be it known that we, ORLANDO M. FRIEND and SAMUEL E. FRIEND, citizens of the United States, residing in Hannibal, in the county of Marion and State of Missouri, have invented new and useful Improvements in Machines for Washing, Tempering, Heating, and Hulling Wheat, of which the following is a specification.

This invention relates to certain new and useful improvements in machines for treating wheat for the purpose, in a continuous operation, of washing, heating, tempering and hulling, or cleaning the grain.

The present invention constitutes an improvement in a machine heretofore devised by us, and forming the subject-matter of an application for patent, Ser. No. 793,541, filed October 6th, 1913.

The present invention aims more particularly to improve the feeding device which regulates the flow of grain into the machine, and also to provide means for supplying water and steam to the interior of the casing, and to automatically control the supply of same, proportionately to the flow of the grain, and to stop the flow of same entirely when the flow of grain is stopped.

In the accompanying drawing illustrating our invention,—Figure 1 is a view partly in longitudinal section and partly in elevation, showing a machine embodying our invention; Fig. 2 is a cross sectional view thereof, on the lines 2—2 and 2ª—2ª of Fig. 1; Fig. 3 is a cross section on the line 3—3 of Fig. 1; Fig. 4 is a view in elevation of one of the beater arms; and Fig. 5 is a fragmentary view of the end portion of one of the beater arms.

Referring now to these drawings, the numeral 1 indicates the casing of the machine, which in practice is about four feet in length, the bottom portion being semi-circular in cross section, and having perpendicular side members 2 which support a top or cover 3, preferably made in two parts, as shown.

The numerals 4 indicate the ends of the casing, to each of which is secured a casting 5 affording a bearing 6 and a standard 7 on which the machine is supported. The ends 4 are centrally apertured concentrically with the bottom portion of the casing, and projecting through these apertures, and into the bearing 6 is a shaft 8 which extends longitudinally through the casing. Fixedly secured at the center of this shaft is a force feed device in the form of a double auger 9 which is concentric with the semi-circular bottom portion, and is adapted to rotate at a distance of about one-half an inch therefrom.

Mounted on the side walls 2 is a partition 10 which is provided with a semi-circular recess to surround the auger so as to provide, with the bottom portion of the casing, a circular space in which said auger rotates, and which, with said auger, serves to divide the casing into two chambers, one of which, at the right of the auger, as shown in Fig. 1, and indicated by the numeral 11, we term the agitating chamber, and the other of which, to the left of the auger, and indicated by the numeral 12, we term the hulling chamber.

Mounted on the shaft 8 in the chamber 11 are a series of S-shaped agitators 13, which are arranged from right to left in a progressively-advanced relation to each other about the shaft, and are designed to be rotated with their convex side foremost. Similarly mounted on the shaft 8 in the chamber 12 are a series of agitators 14 which are similar in all respects to the agitators 13. Both sets of agitators have their outer or convex face forwardly-inclined, that is, inclined toward the left-hand end of the machine, as indicated more clearly at 15 in Fig. 5, so as to impart a slight forward movement to the grain as it is agitated. In addition, the outer portion of each convex face of the agitators is provided with a series of transverse ribs 16 to provide a more severe frictional action on, or rubbing of, the grain, than occurs with a perfectly smooth surface, as contemplated in our prior machine referred to.

The top 3 of the casing is provided near one end with an opening 17 which is surrounded by a vertically-disposed housing 18, secured to the top of, and communicating with which is a longitudinally-disposed housing 19. Extending through the housing 18, and pivotally mounted in the side walls thereof is a rock shaft 20 to which is fixedly secured at its upper end a swinging valve 21, the free end of which moves in proximity to the wall of the casing 18. The rock shaft 20 has an arm 22 formed integral with, or fixedly secured to one end thereof, and projecting rearwardly therefrom, slidably and adjustably mounted on which is a weight 23. By adjusting this weight on the arm 22, the weight of grain necessary to maintain the valve 21 in an open position may be varied, thus tending to regulate the feed of the grain, while the valve will tend to automatically close as the maximum flow of grain permitted by the adjustment decreases. This automatic action of the valve, in conjunction with the spring hereinafter referred to, is utilized in controlling the admission of water and of steam to the grain through the mechanism now to be described.

Mounted on the cover 3, and extending therethrough to communicate with the interior of the casing, is a pipe 24 which is provided with a cup 25. The numeral 26 indicates a water pipe communicating with any suitable source of supply and having a depending end portion 27 terminating above the cup 25 and provided with a valve 28 which may be turned to various positions to regulate the maximum amount of water which may pass into the cup 25 and thence into the casing. By having the water flow into the cup 25 in the manner described, the attendant is able to ascertain by observation whether the water is running, and also, in a general way, the amount of water being supplied to the wheat. The numeral 29 indicates a steam pipe communicating with any suitable source of supply, and having a vertically-disposed portion 30 provided with a valve casing 31 in which is mounted a valve 32. Connected with the pipe 30 is a horizontal extension 33 provided with a hand valve 34 and having an end portion 35 which communicates with the interior of the casing 1 in the chamber 11 at a point considerably nearer the center of the casing 1 than the point at which the water pipe 24 enters said casing. The water pipe 27 is also provided with a valve casing 36 in which is mounted a valve, (not shown) and which is preferably of the type known as a gate valve. Secured to one end of the stem 37 of this valve is an arm 38, the outer end of which is pivotally connected to one end of a link 39, the opposite end of which is pivotally connected to one end of a lever 40, which is pivotally mounted at 41 intermediate its ends on the side wall of the casing 18. The lower end of the lever 40 is provided with a series of apertures 42 in one or the other of which is connected, by a suitable pin, one end of a connecting rod 43, the opposite end of which is provided with a series of apertures 44, in one or the other of which is connected, by a suitable pin, the outer end of a crank arm 45, the opposite end of which is connected to one end of the rock shaft 20. A coil spring 46 is connected at opposite ends to the lever 40 and crank arm 45 near their upper and lower ends, respectively. Pivotally connected to the lever 40 between the pivot 41 and its outer end is one end of a link 47, the opposite end of which is connected to the outer end of a crank arm 48, the lower end of which is connected to the stem of the valve 32.

From the construction described, it will be seen that as the valve 21 is moved downward by the weight of the grain such movement, through the lever mechanism above described, will open the valves of the water and steam pipes, and as the flow of grain ceases, and the valve 21 rises, the opposite movement of these parts occasioned thereby will close these valves and stop the flow of water and steam. It is desirable to start and stop the flow of water practically coincident with the flow or cessation of flow of the grain, and this we attain by having the connecting rod operating the crank arm of the water valve connected to the outer end of the lever 40, which, of course, has a greater arc of movement and moves faster than any part of the lever nearer the pivot 41. The rapidity with which the valves are closed in the operation of the device can be regulated by connecting the end of the rod 43 to the lever 40 nearer to or farther from the lower end thereof, as will be readily understood. The spring 46 acts with the weight 23 in tending to close the valve 21, and further acts to prevent the valve 21 from constantly vibrating or rocking up and down, as frequently occurs when only the weight 23 is employed, the spring exerting a uniform tension, while the resistance of the weight decreases as the valve opens wider and increases as the valve moves upward.

Extending through the horizontal casing 19 and journaled in bearings 49 at opposite ends thereof is a shaft 50 on which is mounted within the casing 19 a worm conveyer 51. The upper side of the casing is provided with an opening 52 to which will be connected a spout, trough, or other suitable conveying means for feeding the wheat into the casing 19. The lower side of the casing 19 is provided near one end with an outlet opening 53 which communicates with the casing 18 through the top thereof, as shown in Fig. 2. The outer end of the shaft 50 is provided with a sprocket wheel 54, and a similar sprocket wheel 55 is mounted on a projecting end of the shaft 8, and over these sprocket wheels is passed a sprocket chain 56. The shaft 8 has also secured to its opposite end a pulley 57, by means of which it is rotated through the medium of a belt (not shown). The chamber 12 is provided in one of its vertical side walls with a discharge opening 58, which is normally closed by means of a door 59, hinged at its upper end to the casing 1, as indicated at 60, and provided toward its lower end with an arm 61 on which is adjustably mounted a weight 62, which latter offers a certain amount of resistance to the opening of the door 59 to permit the discharge of grain from the chamber 12 so that the grain is always maintained under pressure.

The casing 19, with its worm conveyer, 51, provides a feed control device, enabling us to stop the flow of grain simultaneously and automatically with the stopping of rotation of the shaft 8, and then the worm conveyer not only ceases to force the grain into the casing 18, but it acts as a closure to the opening 53, to prevent the flow of the grain by gravity into said casing. Such stoppage of the flow of grain will also, as previously explained, stop the supply of water and steam to the casing, by permitting the grain-valve 21 to rise and close the valves in the steam and water pipes, respectively. Thus, if from any accidental cause, such as the breaking of the belt driving the pulley 57, or the slipping of the belt from said pulley, the machine should cease to operate, not only will the flow of grain be stopped, but the further supply of water and steam to the grain remaining in the casing will be prevented. Such excessive treatment of the grain with steam and water would ordinarily ruin it, and the grain besides would become soaked with water, rendering it practically impossible to start the machine without first removing the over-treated grain from the casing.

Prior to our invention it has been the custom to provide special apparatus for heating and tempering or moistening the grain. According to this plan the grain is ordinarily first wetted in one apparatus and then is run into tanks where it is allowed to lay a sufficient length of time for it to temper, *i. e.*, for the moisture to be absorbed by the interior of the grain. After this, if necessary, the grain is subjected to the action of heat. Of course, different millers have different ways of treating their wheat for grinding, but in all cases, so far as we are aware, the devices for wetting or tempering, and heating the grain are separate and distinct from the devices in which the grain is cleaned. According to our invention, the grain may be washed, heated and tempered in chamber 11 simultaneously, and subsequently hulled or cleaned, all in a continuous operation, and the heating may be to any required degree by simply adjusting the valve 34, to regulate the amount of steam admitted to the chamber 11. Of course, the automatic movement of the valve 32 regulates the supply of steam to any degree less than the maximum provided by the adjustment of the valve 34, in proportion to the flow of grain.

After the wheat passes through our machine, it is conveyed to ordinary tempering tanks, where it is allowed to remain for a greater or less length of time, and it is then preferably passed through a second machine, of our construction, but without the use of steam or water, where it is thoroughly polished, after which it is passed through cleaning machines, such as are commonly employed in mills, in which the husk, dirt and germ removed from the grain in our machine, are separated therefrom by suction.

The advantageous results to be secured from the use of our machine, so far as cleaning and tempering the wheat is concerned, are fully set forth in our companion application, and need not be repeated here. As respects heating the wheat, however, we desire to emphasize the advantage and economy in heating the wheat according to the present invention. In the dry heating of wheat, as now commonly practised, a very considerable amount of moisture is expelled from the wheat, and although the wheat may be thoroughly washed and moistened, this loss of moisture can never be totally restored. There is always therefore, what is known as an "invisible loss" in the employment of such system of heating wheat.

According to our invention, wet steam is supplied to the grain, while the grain itself is moist, with the result that not only is the wheat heated, but this is accomplished with an actual gain in moisture in the wheat, instead of a loss.

We claim:

1. In a machine of the class described, in combination with a casing, a rotatable shaft mounted therein, means for agitating and hulling grain mounted on said shaft, a plurality of means for continuously supplying grain and moisture to said casing, means for controlling the supply of moisture to the casing from the flow of grain thereto, a rotatable feed-control device governing such flow of grain, and means for rotating the feed-control device from said shaft.

2. In a device of the class described, in combination with a casing, a shaft mounted therein and carrying agitating and hulling devices, means for turning said shaft, a conduit for supplying grain to the casing, a valve therein movable by the flow of grain, means for supplying moisture to said casing controlled by said valve, a grain receiver communicating with said conduit, a worm feed device mounted in said grain receiver above the valve in said conduit, and adapted, in operation, to continuously feed grain into the latter, and means for rotating the worm feed device from said shaft.

3. In a machine of the class described, in combination with a casing, a rotatable shaft mounted therein, means for agitating and hulling grain mounted on said shaft, a grain conduit communicating with the casing, a valve therein movable by the flow of the grain, pipes for supplying water and steam to said casing, valves in said pipes, mechanism connecting the grain valve with said water and steam valves, whereby to automatically control the supply of water and steam to the casing from the flow of grain, a housing communicating with said conduit and having an inlet for grain, a rotatable feed-control device in said housing located above the grain valve in said conduit, and adapted, in operation, to continuously feed grain into the latter, and means for rotating said feed-control device from said shaft.

4. In a device of the class described, in combination with a casing, agitating and hulling devices mounted therein, valved pipes for supplying water and steam, respectively, to said casing, a conduit for supplying grain to said casing, a weighted valve mounted therein, lever mechanism operatively connected with said valve and the valves of said water and steam pipes whereby to control the latter from the movements of the former, and a spring connecting two movable members of said lever mechanism and tending normally to resist the opening movement of said valve.

In testimony whereof, we have hereunto set our hands in presence of two subscribing witnesses.

ORLANDO M. FRIEND.
SAMUEL E. FRIEND.

Witnesses:
C. R. MAHAN,
HUGH HARRIS.

Copies of this patent may be obtained for five cents each, by addressing the "Commissioner of Patents, Washington, D. C."